United States Patent
Baek et al.

(10) Patent No.: US 8,802,284 B2
(45) Date of Patent: Aug. 12, 2014

(54) BATTERY PACK

(75) Inventors: Woon-Seong Baek, Yongin-si (KR); Jong-Pil Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 341 days.

(21) Appl. No.: 12/957,592

(22) Filed: Dec. 1, 2010

(65) Prior Publication Data

US 2011/0250489 A1  Oct. 13, 2011

(30) Foreign Application Priority Data

Apr. 12, 2010 (KR) .................. 10-2010-0033328

(51) Int. Cl.
*H01M 10/02* (2006.01)
*H01M 10/04* (2006.01)
*H01M 2/02* (2006.01)

(52) U.S. Cl.
USPC .......................................... 429/186; 429/163

(58) Field of Classification Search
USPC ............ 429/1–11, 47–347; 411/399; D8/387
See application file for complete search history.

(56) References Cited

U.S. PATENT DOCUMENTS

| | | | | | |
|---|---|---|---|---|---|
| 4,917,555 | A | * | 4/1990 | Taubert | 411/411 |
| 5,061,135 | A | * | 10/1991 | Pritchard | 411/411 |
| 6,341,546 | B1 | * | 1/2002 | Totsu | 81/460 |
| 7,160,073 | B2 | * | 1/2007 | Mizuno et al. | 411/387.4 |
| 7,622,219 | B2 | | 11/2009 | Ota et al. | |
| 2004/0071524 | A1 | * | 4/2004 | Habermehl | 411/399 |
| 2006/0068277 | A1 | | 3/2006 | Kim et al. | |
| 2006/0115727 | A1 | | 6/2006 | Kim et al. | |
| 2008/0233472 | A1 | | 9/2008 | Ota et al. | |
| 2009/0155631 | A1 | | 6/2009 | Baek et al. | |
| 2011/0064540 | A1 | * | 3/2011 | Walther | 411/399 |

FOREIGN PATENT DOCUMENTS

| | | | |
|---|---|---|---|
| EP | 1342800 | * | 10/2003 |
| EP | 2077396 | * | 8/2009 |
| JP | 09203406 | A | 8/1997 |
| KR | 10-2005-0076677 | | 7/2005 |
| KR | 10-2005-0090530 | | 9/2005 |
| KR | 10-2007-0071300 | | 7/2007 |
| KR | 20070072426 | A | 7/2007 |
| KR | 2009-0063846 | A | 6/2009 |

OTHER PUBLICATIONS

Korean Office Action issued by Korean Patent Office on Jul. 19, 2011, corresponding to Korean Patent Application No. 10-2010-0033328 and Request for Entry of the Accompanying Office Action attached herewith, pp. 1-5.
Machine translation of JP 09-203406, (Yamamoto, Published Aug. 1997, pp. 1-11).

\* cited by examiner

*Primary Examiner* — Basia Ridley
*Assistant Examiner* — Caitlin Wilmot
(74) *Attorney, Agent, or Firm* — Robert E. Bushnell, Esq.

(57) ABSTRACT

A battery pack that includes a case and a bare cell. The battery pack further includes a screw for combining the case and the bare cell to each other. The screw includes: a head portion having a screw groove formed in a first surface thereof; a body portion disposed on a second surface of the head portion and including a screw thread; and a connection portion disposed between the head portion and the body portion, wherein a thickness of the head portion is within 0.3 to 1 mm.

18 Claims, 8 Drawing Sheets

BATTERY PACK

RELATED APPLICATIONS

This application claims the benefit of Korean Patent Application. No. 10-2010-0033328, filed on Apr. 12, 2010, in the Korean Intellectual Property Office, the disclosure of which is incorporated herein in its entirety by reference.

BACKGROUND

1. Field

Aspects of the present invention relate to a battery pack.

2. Description of the Related Art

In these days, portable electric/electronic devices that are compact and light-weight, such as cellular phones, notebook computers, camcorders, and the like, have been briskly developed and manufactured. In addition, portable electric/electronic devices include a battery pack so that they can operate even in a place where a power source is not provided. Such a battery pack employs a secondary battery that is chargeable and dischargeable in consideration of economical aspects. Representative secondary batteries include nickel-cadmium (Ni—Cd) batteries, nickel-metal hydride (Ni—MH) batteries, lithium (Li) batteries, lithium ions (Li-ion) secondary batteries, and the like. In particular, Li-ion secondary batteries have an operating voltage that is about three times higher than that of Ni—Cd batteries or Ni—MH batteries, which are widely used as a power source of portable electronic equipment. Also, Li-ion secondary batteries are widely used because they have a high energy density per unit weight.

The above information disclosed in this Related Art section is only for enhancement of understanding of the background of the invention and therefore it may contain information that does not form the prior art that is already known to a person of ordinary skill in the art.

SUMMARY

One aspects of the present invention include a battery pack having improved durability by using a screw to combine a case and a bare cell together.

Additional aspects will be set forth in part in the description which follows and, in part, will be apparent from the description, or may be learned by practice of the presented embodiments.

According to aspects of the present invention, a battery pack includes: a case; and a bare cell, wherein the battery pack further includes a screw for combining the case and the bare cell to each other, wherein the screw includes: a head portion having a screw groove formed in a first surface thereof; a body portion disposed on a second surface of the head portion and including a screw thread; and a connection portion disposed between the head portion and the body portion, wherein a thickness of the head portion is within 0.3 to 1 mm.

A thickness of the head portion may be within 0.6 to 0.8 mm.

A pitch of the screw thread may be within 0.2 to 0.4 mm. A pitch of the screw thread may be within 0.25 to 0.35 mm. A screw angle of the screw thread may be within 30° to 35°. A screw angle of the screw thread may be within 32.5° to 33.5°. A first screw angle of the screw thread may be within 21.5° to 22.5°, and a second screw angle of the screw thread may be within 10.5° to 11.5°.

The screw groove may be polygonal in shape.

A thickness of the head portion at one point in a first line that passes a center of the head portion on the first surface of the head portion may be greater than a thickness of the head portion at end portions of the first line.

An edge portion of the second surface of the head portion may have a curvature radius within 0.1 to 0.3 mm. An edge portion of the second surface of the head portion may have a curvature radius within 0.05 to 0.1 mm.

Sides of the screw groove of the head portion may be vertically formed in a thickness direction of the head portion. Sides of the screw groove of the head portion may be taper in a thickness direction of the head portion.

A ratio of a thickness of the head portion with respect to a height of the body portion may be within 1:2.5 to 1:3.5.

A ratio of a safety volume of the screw thread with respect to a safety volume of the bare cell when the screw thread and the bare cell are combined to each other may be within 1:2.5 to 1:3.5.

A ratio of the strength of the screw thread with respect to the strength of the bare cell when the screw thread and the bare cell are combined to each other may be within 2.5:1 to 3.5:1.

The screw threads may number at least eight.

An outer diameter of the body portion may be within 1.23 to 1.27 mm.

An inner diameter of the body portion may be within 0.89 to 0.93 mm.

The battery pack may further include: a protection circuit board disposed at one side of the bare cell and electrically connected to the bare cell; and a tap having one end combined with the protection circuit board and another end combined with the bare cell and including a combination hole through which the screw passes, wherein the protection circuit board is disposed between the bare cell and the case.

The case may be seated on one side of the bare cell and may have a seat groove and a hole that passes a center of the seat groove, and the head portion of the screw may be seated in the seat groove of the case, and the shape of the connection portion may be formed to conform to a shape of the corresponding surface of the case so as to be securely adhered to the case, and the body portion may pass through the hole and may be combined with a screw accommodation groove of the bare cell.

A lateral surface of the connection portion may be in a form of a curve so that the connection portion is securely adhered to the case, and the curve may have a curvature radius within 0.1 to 0.3 mm.

A lateral surface of the connection portion may be inclined so that the connection portion is securely adhered to the case.

The body portion of the screw may be combined with a screw accommodation groove of the bare cell, and a space may be formed between one end of the body portion of the screw and a bottom surface of the screw accommodation groove.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Conventional secondary batteries that use a Li-based oxide as a positive electrode activation material and a carbon material as a negative electrode activation material. Generally, secondary batteries are largely classified into liquid electrolyte batteries and polymer electrolyte batteries according to the type of an electrolyte. Batteries that use a liquid electrolyte are referred to as Li-ion batteries, and batteries that use a polymer electrolyte are referred to as Li polymer batteries. Such secondary batteries are formed by electrically connecting a bare cell, which is generally formed by sealing an electrode assembly in an electrolyte-containing can, and a protection circuit board to each other. The bare cell charges and discharges electricity due to a chemical reaction, and the protection circuit board protects the bare cell by preventing over-charge and over-discharge while controlling charge and discharge of the bare cell.

According to an embodiment of the present invention, the present invention relates to tapping screws 141 and 142 of a battery pack 100 that combine a bare cell 110 and a case 150.

First, the battery pack 100 will be described with reference to FIGS. 1A, 1B, 1C, 2, and 3, and then, the tapping screws 141 and 142 will be described with referenced to FIGS. 4 through 6.

Figure 1A:
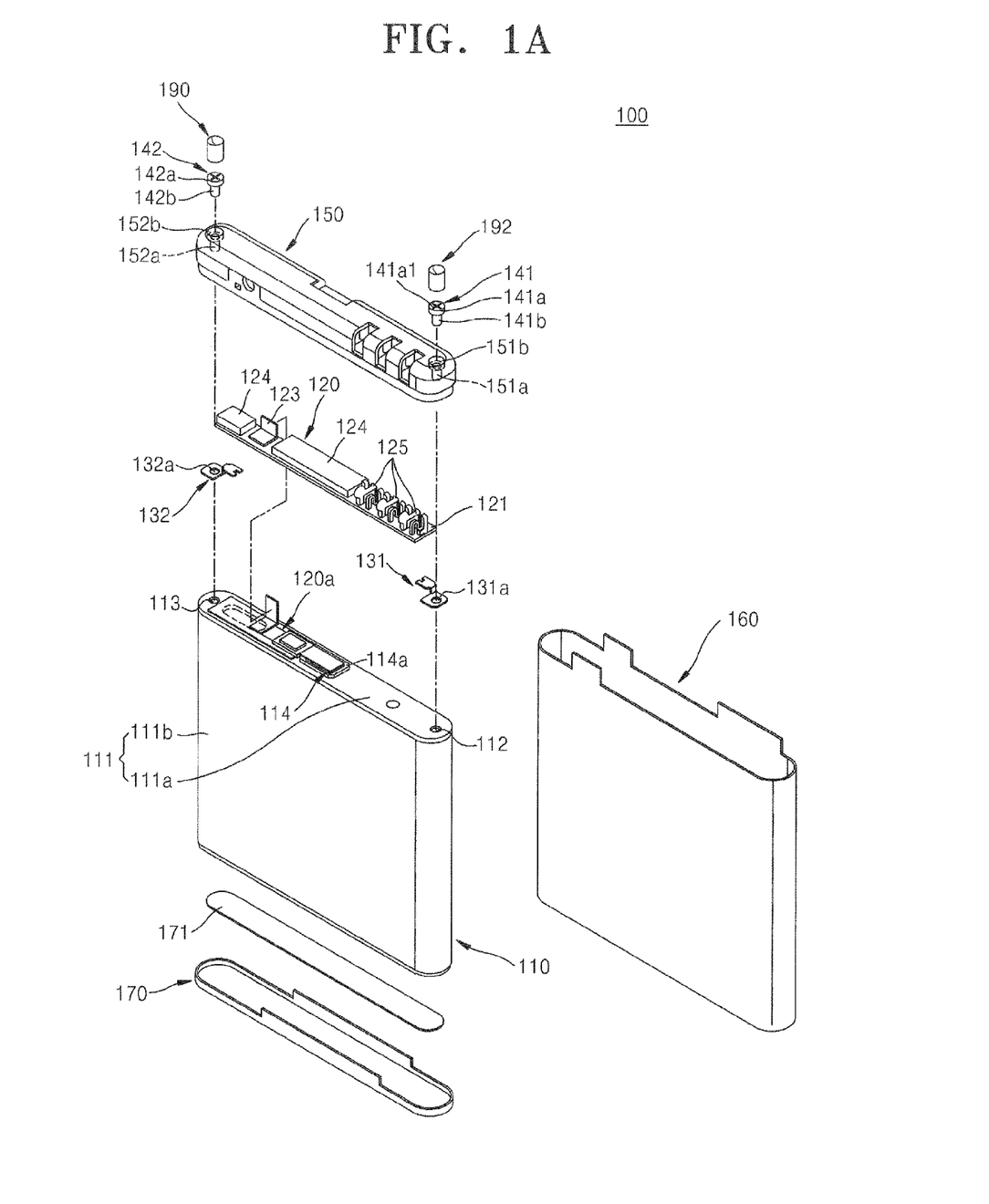
FIG. 1A is an exploded perspective view of a battery pack according to an embodiment of the present invention.
Figure 1B:
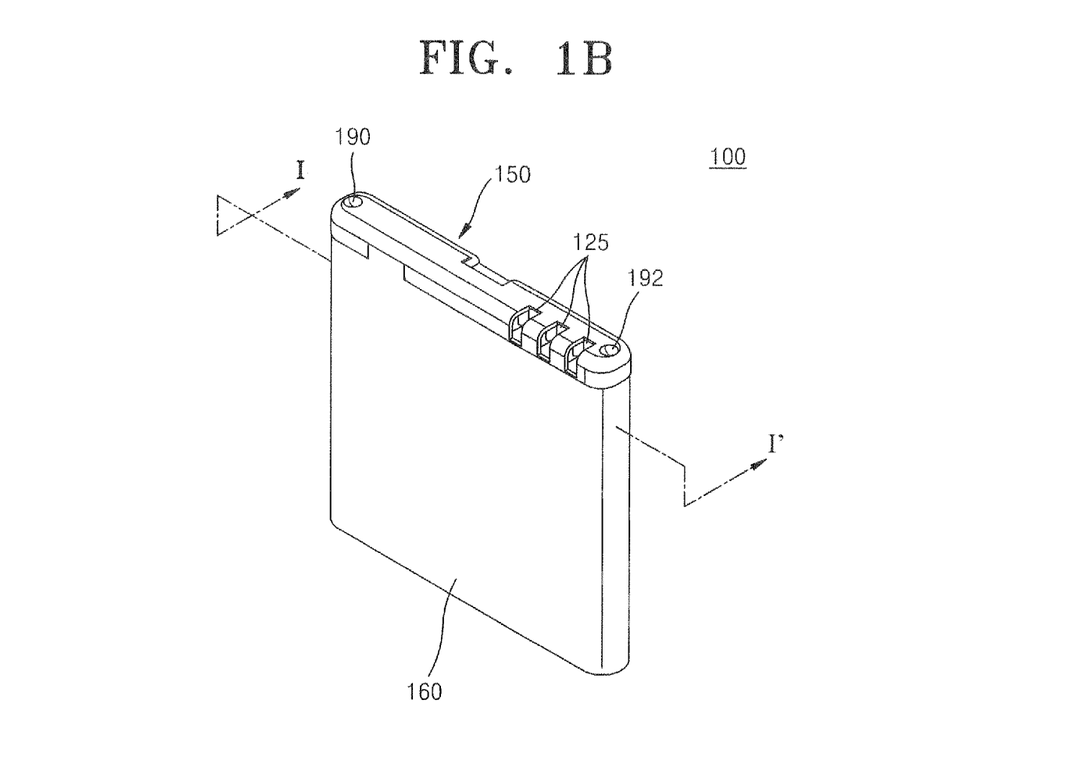
FIG. 1B is a perspective view of the battery pack illustrated in FIG. 1A in a combined state.
Figure 1C:
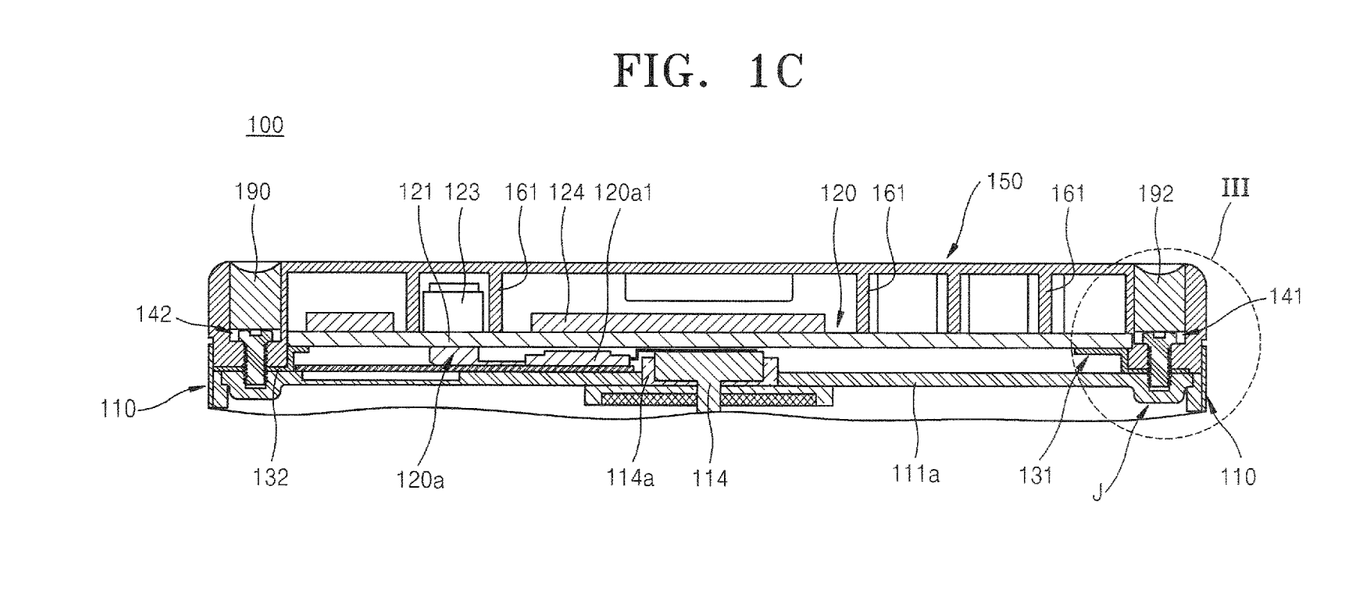
FIG. 1C is a partial cross-sectional view of the battery pack of FIG. 1B taken along a line I-I'.
Figure 2:
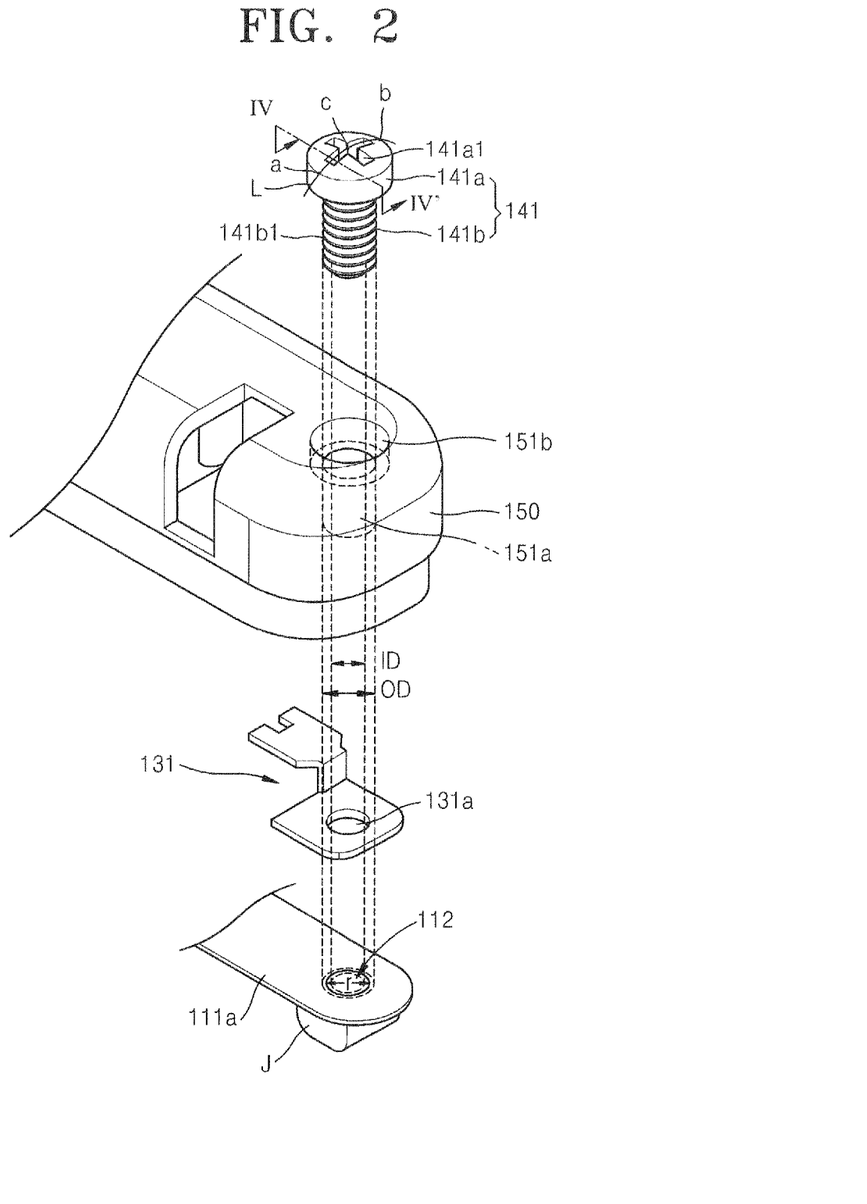
FIG. 2 is a partial exploded perspective view of the battery pack of FIG. 1A.
Figure 3:
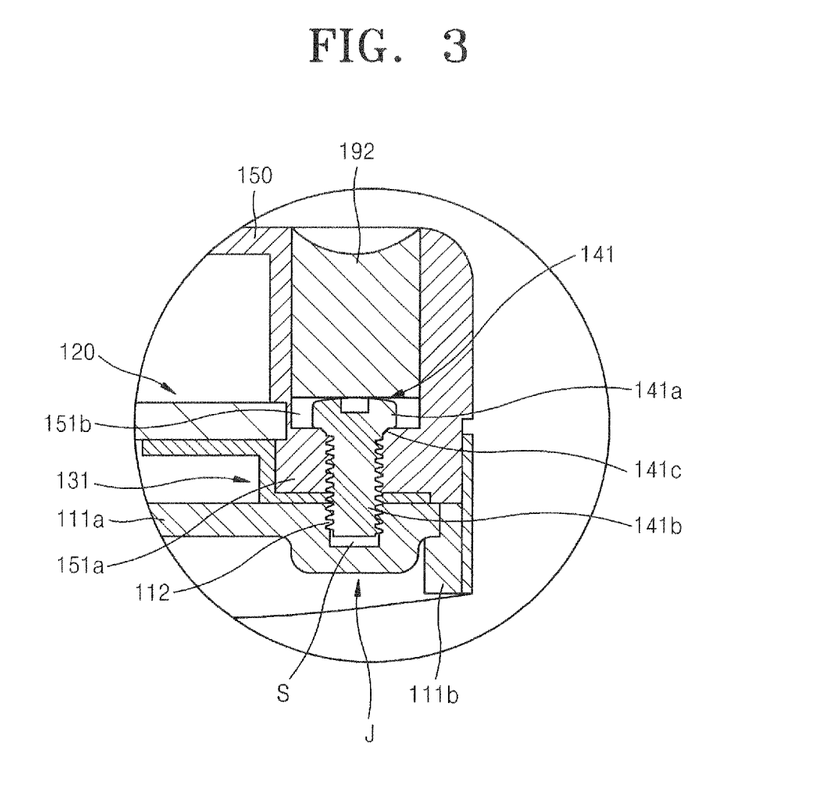
FIG. 3 is a partial enlarged cross-sectional view of a region III of the battery pack of FIG. 1C.

The battery pack 100 will now be described with reference to FIGS. 1A, 1B, 1C, 2, and 3. FIG. 1A is an exploded perspective view of the battery pack 100 according to an embodiment of the present invention. FIG. 1B is a perspective view of the battery pack 100 illustrated in FIG. 1A in a combined state. FIG. 1C is a partial cross-sectional view of the battery pack 100 of FIG. 1B taken along a line I-I'. FIG. 2 is a partial exploded perspective view of the battery pack 100 of FIG. 1A. FIG. 3 is a partial enlarged cross-sectional view of a region III of the battery pack 100 of FIG. 1C. As illustrated in FIGS. 1A, 1B, 1C, 2, and 3, the battery pack 100 includes the bare cell 110, a protection circuit board 120, the case 150, and the tapping screws 141 and 142.

The bare cell 110 may include an electrode assembly (not shown) and a sealing assembly 111 in which the electrode assembly is accommodated. The electrode assembly may include a positive electrode plate (not shown), a negative electrode plate (not shown), and a separator (not shown) wound together or may be stacked on each other. The sealing assembly 111 may include a cap plate 111a and a metal can 111b. The sealing assembly 111 may be formed of a conductive material/metal, such as aluminum (Al). The metal can 111b has a shape in which one end portion thereof is opened, and the cap plate 111a may be disposed on the opening of the metal can 111b so as to close the metal can 111b. In this regard, an electrode terminal 114 may be insulated by an insulator 114a and installed on the metal can 111b or the cap plate 111a. In FIGS. 1A and 1C, the electrode terminal 114 may be insulated by the insulator 114a and may be inserted in the cap plate 111a. In this regard, the positive electrode plate of the bare cell 110 may be electrically connected to the sealing assembly 111, and the negative electrode plate of the bare cell 110 may be electrically connected to the electrode terminal 114. In this regard, the electrode terminal 114, that is, a negative electrode of the bare cell 110, and the sealing assembly 111, that is, a positive electrode of the bare cell 110, may have different polarities. In the present embodiment, the electrode terminal 114 may be electrically connected to the negative electrode plate of the electrode assembly to constitute a negative electrode, and the sealing assembly 111 may be electrically connected to the positive electrode plate of the electrode assembly to constitute a positive electrode. However, constitution of the negative electrode and the positive electrode is not limited thereto. In other words, the bare cell 110 may seal the electrode assembly with the sealing assembly 111 formed of a metal, may electrically connect one of the polarized plates of the electrode assembly to the sealing assembly 111 and may connect the other polarized plate of the electrode assembly to the electrode terminal 114. In this regard, the bare cell 110 may be a secondary battery. For example, the bare cell 110 may be a lithium (Li)-ion battery or a Li polymer battery. However, the type of the bare cell 110 is not limited thereto, and for example, the bare cell 110 may be a nickel-cadmium (Ni—Cd) battery or a nickel-metal hydride (Ni—MH) battery, or the like.

One surface of the cap plate 111a of the bare cell 110 may include first and second screw accommodation grooves 112 and 113. FIGS. 1A and 1C illustrate the cap plate 111a in which the first screw accommodation groove 112 and the second screw accommodation groove 113 are formed. In this regard, the first screw accommodation groove 112 may be combined with the first tapping screw 141, and the second screw accommodation groove 113 may be combined with the second tapping screw 142. Also, screw threads may be formed for the first tapping screw 141 and the second tapping screw 142 on inner circumferential surfaces of the first screw accommodation groove 112 and the second screw accommodation groove 113. Referring to FIG. 1C, the cap plate 111a may have protrusions J formed corresponding to the first and second accommodation grooves 112 and 113. The protrusions J may be formed on regions of the cap plate 111a at which the first and second tapping screws 141 and 142 may be combined with the first and second accommodation grooves 112 and 113 in such a way as to allow the regions to have a thickness sufficient to accommodate the first and second tapping screws 141 and 142.

The protection circuit board 120 may include an insulating substrate 121, a printed circuit pattern (not shown), a conductive pad 123, a protection circuit unit 124, a charge/discharge terminal 125, and first and second taps 131 and 132. The conductive pad 123, the protection circuit unit 124, and the charge/discharge terminal 125 may be soldered on the printed circuit pattern formed on the insulating substrate 121. The protection circuit board 120 may be electrically connected to the bare cell 110. The protection circuit board 120 and the bare cell 110 may be electrically connected by connecting a negative electrode of the protection circuit board 120 to the electrode terminal 114, that is, the negative electrode of the bare cell 110, via a lead tap 120a and connecting a positive electrode of the protection circuit board 120 to the sealing assembly 111, that is, the positive electrode of the bare cell 110, via the first and second taps 131 and 132. In this regard, a positive temperature coefficient (PTC) element 120a1 is electrically connected between the negative electrode of the protection circuit board 120 and the electrode terminal 114 so that, when an excessive temperature rise occurs in the bare cell 110 or an overcurrent flows through the bare cell 110, the electrical connection between the negative electrode of the protection circuit substrate 120 and the electrode terminal 114 can be disrupted. Passive elements, such as a resistor, a capacitor, and the like, active elements, such as a field effect transistor (FET), safety elements, such as a PTC element, and integrated circuits (ICs) may be optionally formed in the protection circuit unit 124. Also, the bare cell 110 is charged or discharged via the protection circuit unit 124, and the protection circuit unit 124 disrupts a charge/discharge path of the bare cell 110 when the bare cell 110 is excessively heated or an overcurrent flows through the bare cell 110, thereby preventing lowering of a life span, overheating, an explosion, or the like of the bare cell 110.

The first and second taps 131 and 132 are disposed on ends of the protection circuit board 120 and electrically connect the protection circuit board 120 and the bare cell 110 to each other. Combination holes 131a and 132a may be respectively formed in the first and second taps 131 and 132 to correspond to the screw accommodation grooves 112 and 113. Referring to FIG. 1C, the first tap 131 and the second tap 132 are connected to the cap plate 111 a of the bare cell 110. In this regard, the first combination hole 131a and the second combination hole 132a are respectively formed on the first tap 131 and the second tap 132 to correspond to the first screw accommodation groove 112 and the second screw accommodation groove 113 of the cap plate 111a. The first tap 131 and the second tap 132 support mounting of the protection circuit board 120 on a surfaced of the bare cell 110 and electrically connect the positive electrode of the protection circuit board 120 and the positive electrode of the bare cell 110 to each other.

The first tap 131 and the second tap 132 may be formed of nickel (Ni) or an alloy including Ni and may be soldered on the protection circuit board 120. In this regard, in FIG. 1A, the protection circuit board 120 is connected to two taps, i.e., the first tap 131 and the second tap 132, but the number of taps is not limited thereto. For example, the protection circuit board 120 may include only the first tap 131.

The first and second tapping screws 141 and 142 are respectively combined with the first screw accommodation groove 112 and the second screw accommodation groove 113 formed on opposite sides of the bare cell 110, thereby preventing distortion of the protection circuit board 120 and further improving a combination force between the first and second tapping screws 141 and 142 and the first and second taps 131 and 132 soldered on the protection circuit board 120 to prevent an increase in a contact resistance between the first and second taps 131 and 132 and the bare cell 110. Also, the first and second tapping screws 141 and 142 include a conductor and electrically connect the protection circuit board 120 and the bare cell 110 to each other. The first and second tapping screws 141 and 142 will be described later in greater detail with reference to further drawings.

At least one hole 151a and 152a may be formed in the case 150. Seat grooves 151b and 152b are formed from outer circumferences of the holes 151a and 152a. In this regard, diameters of the seat grooves 151b and 152b are greater than diameters of the holes 151a and 152a to have a step difference, and for example, head portions 141 a and 142a of the first and second tapping screws 141 and 142 may be supported. Hereinafter, the seat grooves 151b and 152b will be referred to as a first seat groove 151b and a second seat groove 152b. The first tapping screw 141 passes through the first hole 151 a formed in the case 150 and the combination hole 131 a formed in the first tap 131 and then may be combined with the first screw accommodation groove 112 formed in the bare cell 110. In this regard, the head portion 141a of the first tapping screw 141 may be closely adhered to the first seat groove 151b of the case 150. The second tapping screw 142 may also be combined with the second screw accommodation groove 113 in a similar manner to the first tapping screw 141. Thus, the first tapping screw 141 and the second tapping screw 142 allow the case 150 to be combined with the bare cell 110. The case 150 may be a plastic case formed by injecting a resin material, such as a polycarbonate. The case 150 protects the protection circuit board 120 from an external shock and prevents a short circuit from occurring. Also, referring to FIG. 1C, a rib 161 is formed in an inner side of the case 150. The rib 161 supports an upper surface of the protection circuit board 120 and may allow the protection circuit board 120 to be securely adhered to the bare cell 110. Thus, movement of the protection circuit board 120 may be prevented, and the contact resistance between the first and second taps 131 and 132 soldered on the protection circuit board 120 and the bare cell 110 may be prevented from being increased due to a shock. Also, the case 150 allows the first and second taps 131 and 132 to be securely adhered to the bare cell 110, thereby preventing an increase in the contact resistance between the first and second taps 131 and 132 and the bare cell 110. In this regard, when the case 150 and the first and second tapping screws 141 and 142 are combined to each other, the first and second taps 131 and 132 are more securely adhered to the bare cell 110, thereby preventing an increase in the contact resistance between the first and second taps 131 and 132 and the bare cell 110. In this regard, the first and second screw accommodation grooves 112 and 113 may have depths at which a space S is formed between the first and second tapping screws 141 and 142 and bottom surfaces of the first and second screw accommodation grooves 112 and 113. In this manner, the space S is formed between the first and second screw accommodation grooves 112 and 113 and the first and second tapping screws 141 and 142 so that crumbs that occur when the first and second tapping screws 141 and 142 are combined with the first and second screw accommodation grooves 112 and 113 may be accommodated in the space S.

After the first and second tapping screws 141 and 142 are combined with the case 150, covers 190 and 192 may be respectively disposed on the first and second tapping screws 141 and 142. In this regard, the covers 190 and 192 may prevent moisture or dust outside the case 150 from contacting the first and second tapping screws 141 and 142. In this case, the covers 190 and 192 may cover at least the seat grooves 151b and 152b of the case 150.

Also, after the case 150 is combined with the protection circuit board 120, the case 150 and a label 160 may cover the bare cell 110.

Also, the bare cell 110 may be further covered by an auxiliary case 170 so that edge portions of the bare cell 110 may be protected from an external shock. In this regard, a double-sided tape 171 may be formed between the auxiliary case 170 and the bare cell 110, and the auxiliary case 170 may be combined with the bare cell 110 via the double-sided tape 171.

Referring to FIG. 2, the first tapping screw 141 passes through the combination hole 131a of the first tap 131 and may be combined with the first screw accommodation groove 112 of the cap plate 111a. Hereinafter, the first tapping screw 141 will be described, but descriptions thereof may be obviously applied to the second tapping screw 142.

An inner diameter of the first combination hole 131a may be greater than an inner diameter (ID) of a body portion 141b of the first tapping screw 141 and less than an outer diameter (OD) thereof, for example. In this regard, the inner diameter of the first combination hole 131 a is varied when the first combination hole 131a is combined with the first tapping screw 141 and may be securely adhered to the first tapping screw 141. As the first combination hole 131a and the first tapping screw 141 are securely adhered to each other, an electrical resistance therebetween is reduced. Also, a diameter r of the first screw accommodation groove 112 of the cap plate 111a may be greater than the inner diameter ID of the body portion 141b of the first tapping screw 141 and less than the outer diameter (OD) thereof. In this regard, the inner circumferential surface of the first screw accommodation groove 112 is cut by a plurality of screw threads 141b1 of the first tapping screw 141 when the first screw accommodation groove 112 is combined with the first tapping screw 141 and is deformed so that the first screw accommodation groove 112 may be securely adhered to the body portion 141b of the first tapping screw 141.

The first tapping screw 141 allows the cap plate 111a and the case 150 to be combined to each other and electrically connects the first tap 131 and the cap plate 111a to each other. In this regard, obviously, the first tapping screw 141 may be a conductor.

Defects that occur frequently when the cap plate 111a and the case 150 are combined to each other, include damage of a screw groove 141a1 formed in a head portion 141a of the first tapping screw 141, a fracture of the head portion 141a, and damage of the case 150, or the like. In order to solve the problems, the first tapping screw 141 according to an embodiment of the present invention will now be described with reference to FIG. 4.

Figure 4:
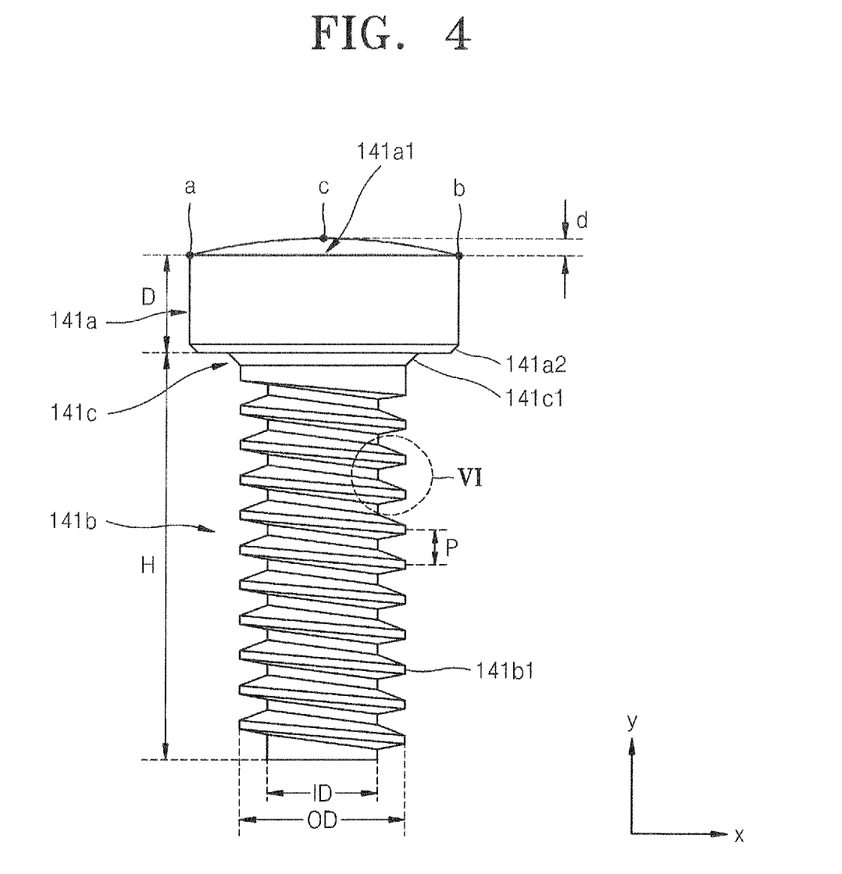
FIG. 4 is a schematic front view of a tapping screw according to an embodiment of the present invention.
Figure 5A:
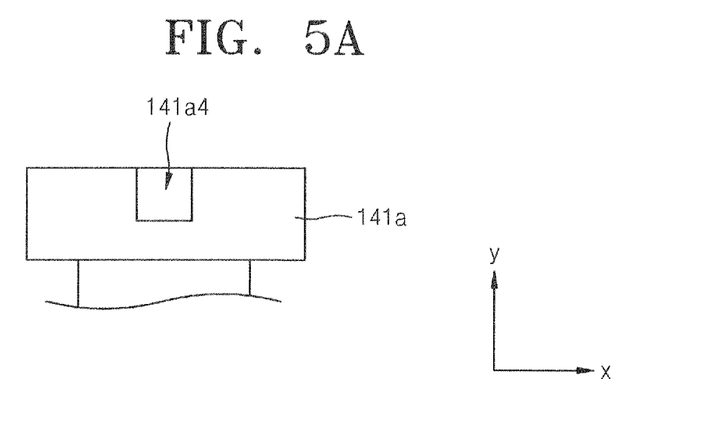
FIG. 5A is a cross-sectional view a tapping screw of FIG. 2 taken along line a Va-Va'.
Figure 5B:
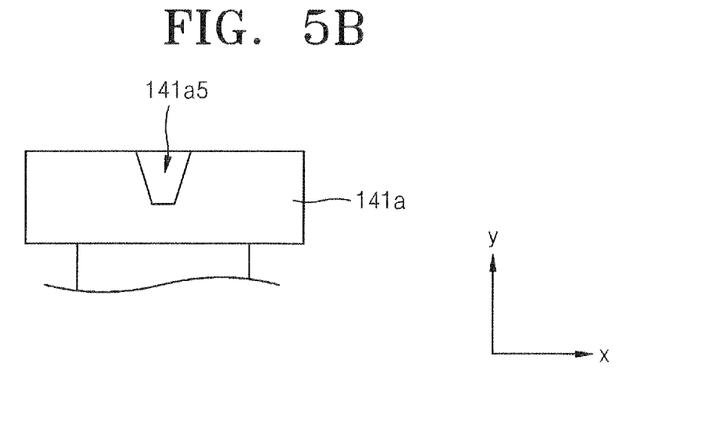
FIG. 5B is a modified example of FIG. 5A.
Figure 5C:
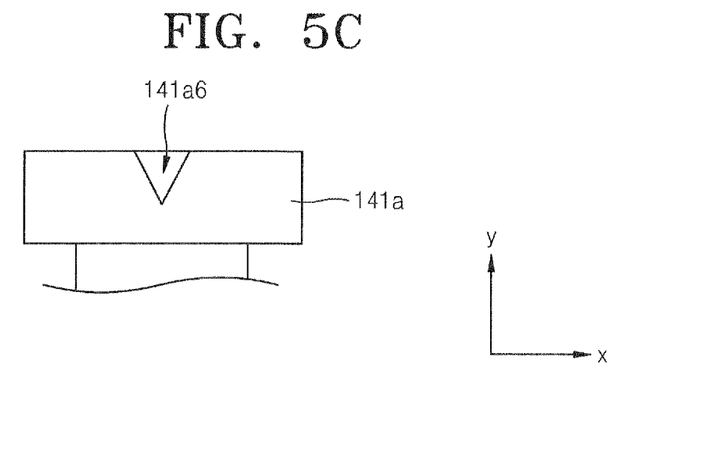
FIG. 5C is another modified example of FIG. 5A.

FIG. 4 is a schematic front view of the first tapping screw 141 according to an embodiment of the present invention. The first tapping screw 141 includes the head portion 141a, the body portion 141b, and a connection portion 141c. The screw groove 141a1 is formed in a first surface of the head portion 141a. The body portion 141b is disposed on a second surface of the head portion 141a, and the screw threads 141b1 are formed on a surface of the body portion 141b. The connection portion 141c is disposed between the head portion 141 a and the body portion 141b. After the head portion 141a is described, the connection portion 141c and the body portion 141b will be described.

As a thickness D of the head portion 141a increases, damage of the screw groove 141a 1, a fracture of the head portion 141a, or the like are more likely to be prevented, but simultaneously, it is more difficult to process the battery pack 100 (see FIGS. 1A through 1C). On the other hand, as the thickness D of the head portion 141 a decreases, it is easier to process the battery pack 100 (see FIGS. 1A through 1C) but durability of the battery pack 100 (see FIGS. 1A through 1C) is lowered. In consideration of easy processing and the durability of the battery pack 100 (see FIGS. 1A through 1C), the thickness D of the head portion 141a may be within 0.3 to 1 mm In more detail, the thickness D of the head portion 141a may be within 0.6 to 0.8 mm.

The thread groove 141a 1 may be formed in the first surface of the head portion 141a. In this regard, the screw groove 141a1 is combined with a tool, such as a driver or the like, and allows a rotative force to be transferred to the first tapping screw 141 from the tool. In this regard, the screw groove 141a1 may be polygonal. For example, referring to FIG. 1A, the screw groove 141a1 may be '+'-shaped. However, the shape of the screw groove 141a1 is not limited thereto, and besides the '+'-shape, the screw groove 141a1 may have any of various polygonal shapes, such as '*', 'Y', '☆', '□', 'Δ' and the like.

A thickness of the head portion 141a at one point in a first line L of FIG. 2 that passes a center c of the head portion 141a on the first surface of the head portion 141a is greater than a thickness of the head portion 141a both end portions a and b of the first line L. For example, referring to FIG. 3, a thickness (D+d) at the center c of the head portion 141a may be formed by extending the thickness D of the head portion 141a at both end portions a and b of the first line L in a first direction y by an additional length d. Thus, the first surface of the head portion 141a may protrude in the first direction y. An area in which the first surface of the head portion 141a contacts a tool, such as a driver or the like, increases so that damage of the screw groove 141a may be prevented.

A cross-sectional shape of the screw groove 141a1 formed in the first surface of the head portion 141a will be described with reference to FIGS. 5A through 5C. FIG. 5A is a cross-sectional view of the first tapping screw 141 of FIG. 2 taken along a line IV-IV'. Referring to FIG. 5A, sides of a screw groove 141a4 of the head portion 141a may be perpendicular to the second surface of the head portion 141a in a thickness direction y of the head portion 141a. FIG. 5B is a modified example of FIG. 5A. Referring to FIG. 5B, sides of a screw groove 141a5 of the head portion 141a may taper in the thickness direction y of the head portion 141a. In this regard, a bottom of the screw groove 141a5 may be flat, or a bottom of a screw groove 141a6 may be slanted, as illustrated in FIG. 5C, that is, another modified example of FIG. 5A.

When an edge portion 141a2 of the second surface of the head portion 141 a has a large curvature radius, the edge portion 141a2 may burrow into the seat groove 151b and the first hole 151a and thus may damage the case 150. Thus, as the curvature radius of the edge portion 141a2 of the second surface of the head portion 141 is decreased, damage of the case 150 may be prevented, and an area in which the second surface of the head portion 141a and the seat groove 151b contact each other is increased. In this regard, the curvature radius of the edge portion 141$a$2 of the second surface of the head portion 141$a$ may be equal to or less than 0.3 mm. For example, the curvature radius of the edge portion 141$a$2 of the second surface of the head portion 141$a$ may be 0.05 to 0.3 mm. In this regard, the head portion 141$a$ may be formed via a forging process, and the head portion 141$a$ may be formed via a cutting process to reduce the curvature radius of the edge portion 141$a$2 of the second surface of the head portion 141$a$.

Now, the connection portion 141$c$ will be described. Referring to FIG. 3, the connection portion 141$c$ may be formed to correspond to the first hole 151$a$ and the seat groove 151$b$ of the case 150 so as to be securely adhered to the case 150. In this regard, a connection portion lateral surface 141$c$1 may be in the form of a curve to be securely adhered to the case 150. In this regard, a curvature radius of the curve may be 0.1 to 0.3 mm. Obviously, the connection portion lateral surface 141$c$1 may have a curvature radius that is greater than or less than the curvature radius of the corresponding surface of the case 150 so as to be securely adhered to the case 150. Also, the connection portion lateral surface 141$c$1 may be inclined to correspond to the shape of the case 150. The shape of the connection portion lateral surface 141$c$1 is not limited thereto, and the connection portion lateral surface 141$c$1 may have any of various shapes according to the shape of the case 150.

Now, the body portion 141$b$ will be described. The screw threads 141$b$1 may be formed on the body portion 141$b$. Referring to FIG. 2, the screw threads 141$b$1 of the first tapping screw 141 may be combined with the screw accommodation groove 112 while cutting the inner circumferential surface of the screw accommodation groove 112. In this case, the cap plate 111$a$ may include a soft alloy so that the cap plate 111$a$ may be easily deformed by the screw threads 141$b$1 of the first tapping screw 141. For example, the light alloy may include zinc (Zn), aluminum (Al) or magnesium (Mg). Since the screw threads 141$b$1 of the first tapping screw 141 are combined with the screw accommodation groove 112 while cutting the inner circumferential surface of the screw accommodation groove 112, the screw threads 141$b$1 of the first tapping screw 141 should be designed in consideration of various factors, such as friction of the screw accommodation groove 112, and the like. The factors to be considered may be a pitch P, a range of the inner diameter (ID) and the outer diameter (OD) of the body portion 141$b$, the number of screw threads 141$b$1, a screw angle A, a safety volume ratio or strength ratio, and the like.

Referring to FIG. 4, the pitch P is a distance between the screw threads 141$b$1, i.e., a distance between centers of the screw threads 141$b$1. In this regard, the pitch P may be within 0.2 to 0.4 mm Alternatively, the pitch P of the screw threads 141$b$1 may be within 0.25 to 0.35 mm. Alternatively, the pitch P of the screw threads 141$b$ may be within 0.315 to 0.325 mm, e.g., about 0.32 mm.

The outer diameter (OD) is an outer diameter of the body portion 141$b$, and the inner diameter (ID) is an inner diameter thereof In detail, a circumscribed circle formed by a peak of the screw thread 141$b$1 of the body portion 141$b$ may be the outer diameter (OD), and an inscribed circle formed by a valley of the screw thread 141$b$1 may be the inner diameter (ID). In this regard, the outer diameter (OD) may be within 1.23 to 1.27 mm. The inner diameter (ID) may be within 0.89 to 0.93 mm.

Also, a ratio of the thickness D of the head portion 141$a$ with respect to a height H of the body portion 141$b$ may be within 1:2.5 to 1:3.5, for example, about 1:3.

Also, the number of screw threads 141$b$1 may be at least eight. In this regard, the number of screw threads 141$a$1 is the number of complete revolutions of the screw threads 141$b$1. Also, when the case 150 and the bare cell 110 are combined to each other, at least eight or more screw threads may be formed so as to obtain a sufficient combination force therebetween.

The screw angle A will be described with reference to FIG. 6. FIG. 6 is a partial enlarged cross-sectional view of a region VI of the first tapping screw 141 of FIG. 4. The screw angle A is an angle formed by inclined surfaces 141$b$11 and 141$b$12 of the screw thread 141$b$1. In this regard, the screw angle A may be represented as a sum of a first screw angle A1 and a second screw angle A2. Here, the first screw angle A1 is an angle A1 formed between the first inclined surface 141$b$11 and a line V formed through an intersection point O where extension lines of the inclined surfaces 141$b$11 and 141$b$12 of the screw thread 141$b$1 meet with one another and perpendicular to a non-inclined surface of the screw thread 141$b$1. The second screw angle A2 is an angle A2 formed between the second inclined surface 141$b$12 and the line V. In this regard, the tapping screw 141 according to the present embodiment may have the screw angle A within 30° to 35°. For example, the screw angle A of the screw thread 141$b$ may be within 32.5° to 33.5°, e.g., about 33°. Also, the first screw angle A1 and the second screw angle A2 may be different from each other. For example, the first screw angle A1 may be within 21.5° to 22.5°, e.g., about 22°, and the second screw angle A2 may be within 10.5° to 11.5°, e.g., about 11°. In this regard, the first screw angle A1 may facilitate movement into the screw accommodation groove 112, increase a contact surface, and increase an engagement possibility. On the other hand, the second screw angle A2 may prevent a fracture of a screw and reduce resistance during the movement of the screw accommodation groove 112.

In this regard, when the tapping screw 141 and the screw accommodation groove 112 are combined to each other, due to a difference in strengths of materials for forming the tapping screw 141 and the screw accommodation groove 112, the screw accommodation groove 112 may be damaged. To solve this problem, a safety volume ratio of the screw thread 141$b$1 of the tapping screw 141 and the screw accommodation groove 112 and strengths of materials for forming the tapping screw 141 and the screw accommodation groove 112 need to be controlled.

The safety volume is an area of a region where a combination force is applied when the tapping screw 141 and the screw accommodation groove 112 are combined to each other. In this regard, a ratio of strengths of materials for forming the tapping screw 141 and the screw accommodation groove 112 may be about 3:1. Thus, the safety volume may be adjusted to about 1:3 so that the strengths of the materials for forming the tapping screw 141 and the screw accommodation groove 112 may be balanced.

Figure 6:
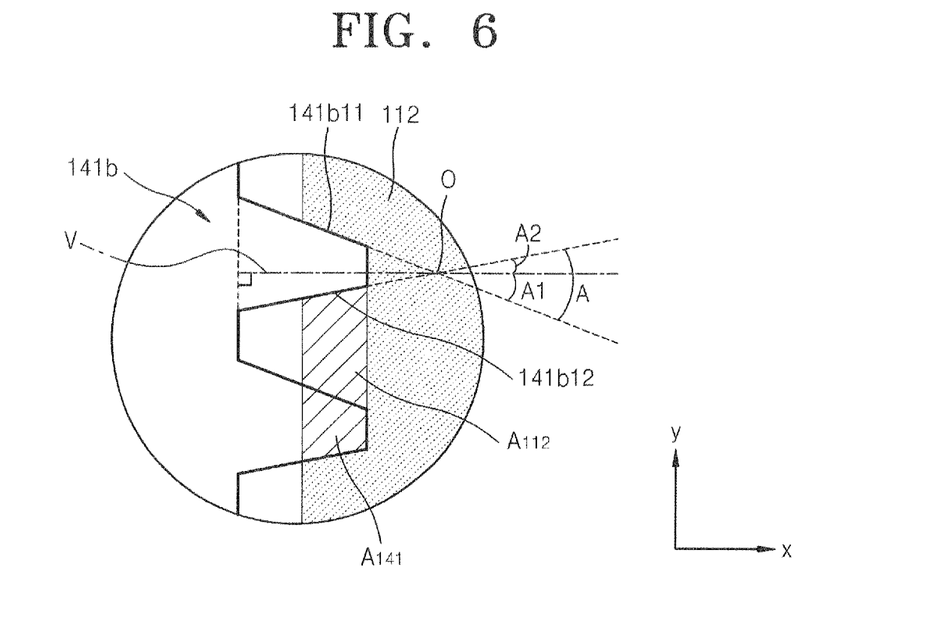
FIG. 6 is a partial enlarged cross-sectional view of a region VI of the tapping screw of FIG. 4.

Referring to FIG. 6, a region between the inclined surfaces 141$b$11 and 141$b$12 where the screw thread 141$b$ and the screw accommodation groove 112 contact each other, is a first safety volume $A_{141}$, that is, a safety volume of the tapping screw 141. In accordance with this, a region between the inclined surfaces 141$b$11 and 141$b$12 that contact the screw thread 141$b$ of the screw accommodation groove 112 is a second safety volume $A_{112}$, that is, a safety volume of the screw accommodation groove 112. In this regard, the ratio of the strengths of the materials for forming the screw thread 141$b$ and the screw accommodation groove 112 of the bare cell 1120 may be within 2.5:1 to 3.5:1, e.g., about 3:1. Also, the ratio of the first safety volume $A_{141}$ with respect to the second safety volume $A_{112}$ may be within 1:2.5 to 1:3.5, e.g., about 1:3.

As described above, according to the one or more of the above embodiments of the present invention, a combination force between a case and a bare cell can be improved, and damage of a tapping screw or an object for combining the case and the bare cell can be prevented.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack, comprising:
   a case; and
   a bare cell,
   wherein the battery pack further comprises a screw for combining the case and the bare cell to each other,
   wherein the screw comprises:
      a head portion having a screw groove formed in a first surface thereof;
      a body portion disposed on a second surface of the head portion and comprising a screw thread; and
      a connection portion disposed between the head portion and the body portion,
   wherein a thickness of the head portion is within 0.6 to less than 0.7 mm,
   wherein a ratio of a thickness of the head portion with respect to a height of the body portion is within 1:2.5 to 1:3.5,
   wherein a pitch of the screw thread is greater than 0.25 and less than or equal to 0.35 mm, and
   wherein an edge portion of the second surface of the head portion has a curvature radius within 0.05 to 0.1 mm.

2. The battery pack of claim 1, wherein a screw angle of the screw thread is within 30° to 35°.

3. The battery pack of claim 1, wherein a screw angle of the screw thread is within 32.5° to 33.5°.

4. The battery pack of claim 1, wherein a first screw angle of the screw thread is within 21.5° to 22.5°, and a second screw angle of the screw thread is within 10.5° to 11.5°.

5. The battery pack of claim 1, wherein the screw groove is polygonal.

6. The battery pack of claim 1, wherein a thickness of the head portion at one point in a first line that passes a center of the head portion on the first surface of the head portion is greater than a thickness of the head portion at end portions of the first line.

7. The battery pack of claim 1, wherein sides of the screw groove of the head portion are vertically formed in a thickness direction of the head portion.

8. The battery pack of claim 1, wherein sides of the screw groove of the head portion are tapered in a thickness direction of the head portion.

9. The battery pack of claim 1, wherein a ratio of a safety volume of the screw thread with respect to a safety volume of a screw accommodation groove of the bare cell when the screw thread and the bare cell are combined to each other is within 1:2.5 to 1:3.5.

10. The battery pack of claim 1, wherein a ratio of a strength of the screw thread with respect to a strength of a screw accommodation groove of the bare cell when the screw thread and the bare cell are combined to each other is within 2.5:1 to 3.5:1.

11. The battery pack of claim 1, wherein the screw threads number at least eight.

12. The battery pack of claim 1, wherein an outer diameter of the body portion is within 1.23 to 1.27 mm.

13. The battery pack of claim 1, wherein an inner diameter of the body portion is within 0.89 to 0.93 mm.

14. The battery pack of claim 1, further comprising:
   a protection circuit board disposed at one side of the bare cell and electrically connected to the bare cell; and
   a tap having one end combined with the protection circuit board and another end combined with the bare cell and comprising a combination hole through which the screw passes,
   wherein the protection circuit board is disposed between the bare cell and the case.

15. The battery pack of claim 1, wherein the case is seated on one side of the bare cell and has a seat groove and a hole that passes a center of the seat groove, and the head portion of the screw is seated in the seat groove of the case, and the shape of the connection portion is formed to conform to a shape of the corresponding surface of the case so as to be securely adhered to the case, and the body portion passes through the hole and is combined with a screw accommodation groove of the bare cell.

16. The battery pack of claim 15, wherein a lateral surface of the connection portion is in a form of a curve so that the connection portion is securely adhered to the case, and the curve has a curvature radius within 0.1 to 0.3 mm.

17. The battery pack of claim 15, wherein a lateral surface of the connection portion is inclined so that the connection portion is securely adhered to the case.

18. The battery pack of claim 1, wherein the body portion of the screw is combined with a screw accommodation groove of the bare cell, and a space is formed between one end of the body portion of the screw and a bottom surface of the screw accommodation groove.

* * * * *